(12) United States Patent
Cordero Torres et al.

(10) Patent No.: US 8,200,575 B2
(45) Date of Patent: Jun. 12, 2012

(54) SECURE ELECTRONIC PAYMENT SYSTEM AND METHODS

(76) Inventors: Raul Armando Cordero Torres, Querétaro (MX); Juan Carlos Sepúlveda Gonzalez de Candamo, Querétaro (MX); José Andrés Mares Urrutia, Querétaro (MX)

( * ) Notice: Subject to any disclaimer, the term of this patent is extended or adjusted under 35 U.S.C. 154(b) by 795 days.

(21) Appl. No.: 11/246,304

(22) Filed: Oct. 11, 2005

(65) Prior Publication Data

US 2007/0083464 A1    Apr. 12, 2007

(51) Int. Cl.
*G06Q 40/00*    (2006.01)
(52) U.S. Cl. .......................................... 705/39; 705/40
(58) Field of Classification Search ............... 705/10–44
See application file for complete search history.

(56) References Cited

U.S. PATENT DOCUMENTS

| | | | |
|---|---|---|---|
| 5,221,838 A * | 6/1993 | Gutman et al. ............... 235/379 |
| 5,590,038 A * | 12/1996 | Pitroda ........................... 705/41 |
| 5,819,234 A * | 10/1998 | Slavin et al. ................. 340/10.4 |
| 5,883,810 A * | 3/1999 | Franklin et al. ............... 700/232 |
| 6,125,352 A * | 9/2000 | Franklin et al. ................. 705/26 |
| 6,193,155 B1 * | 2/2001 | Walker et al. .................. 235/381 |
| 6,636,833 B1 * | 10/2003 | Flitcroft et al. ..................... 705/1 |
| 7,337,947 B1 * | 3/2008 | Swanson, Sr. ................. 235/375 |
| 7,426,492 B1 * | 9/2008 | Bishop et al. .................... 705/39 |
| 7,877,325 B2 * | 1/2011 | Bishop et al. .................... 705/39 |
| 7,908,214 B2 * | 3/2011 | Bishop et al. .................... 705/39 |
| 7,962,406 B2 * | 6/2011 | Bishop et al. .................... 705/39 |
| 7,979,349 B2 * | 7/2011 | Bishop et al. .................... 705/39 |
| 8,103,585 B2 * | 1/2012 | Bishop et al. .................... 705/40 |
| 2002/0099656 A1 | 7/2002 | Poh Wong ........................ 705/40 |
| 2003/0093367 A1 | 5/2003 | Allen-Rouman et al. ...... 705/39 |
| 2003/0126075 A1 * | 7/2003 | Mascavage et al. ............ 705/39 |
| 2003/0140004 A1 | 7/2003 | O'Leary et al. ................. 705/39 |
| 2005/0033692 A1 | 2/2005 | Jarman et al. ................... 705/41 |

OTHER PUBLICATIONS

International Search Report corresponding to PCT/IB06/04126 dated Aug. 1, 2008.
Ex parte Shricker, 56 USPQ2d 1723.

* cited by examiner

*Primary Examiner* — Frantzy Poinvil
(74) *Attorney, Agent, or Firm* — Hogan Lovells US LLP (57) ABSTRACT

The invention provides a system and method for ensuring secure payment transactions. The invention provides for a chargeable and dischargeable security (CDS) system that allows users/account holders to have greater control over access to their accounts. The CDS-system may include a CDS-instrument, such as a credit or debit card that can be charged with funds located in a first account and then discharged either automatically or manually so that the potential for fraud and misuse are significantly reduced.

41 Claims, 10 Drawing Sheets

SECURE ELECTRONIC PAYMENT SYSTEM AND METHODS

BACKGROUND OF THE INVENTION

1. Field of the Invention

The invention relates to a system and method facilitating secure electronic payment, and more particularly, to a system and methodology allowing users/account holders to control access to funds thus preventing unauthorized access to those funds.

2. Description of Related Art

The traditional methodologies for making payments include the use of currency, paper instruments such as checks, including travelers checks, electronic debit cards and/or credit cards. Each of these conventional payment methodologies have been in use for many years and have their own advantages and disadvantages. For example, paper currency has the advantage of allowing the full transaction to be completed immediately at the point of sale without the need for any further exchange after the good or services have been delivered. In the case of paper currency, the vendor receives payment in cash immediately without requiring any further effort or transaction in order to receive payment. However, paper currency may not be practical in many situations, including where there is a fear of theft or loss of the currency, or when the amount of funds to be transferred is significant. The use of paper instruments, such as checks, is also a common method for making payments. These types of instruments traditionally require a payer to establish an account with a financial institution. The account is designated with an account number which corresponds to the checks. An account holder can then write checks which provide authorization to withdraw a given amount of money from the account. Paper checks allow the transfer of significant sums of money in a relatively simple manner. However, paper checks require the payer to first set up an account with a financial institution and obtain actual paper checks in order to make a payment. Furthermore, on some occasions, checks may take several days to clear, especially for international transactions and are usually restricted to national or even local transactions. Also, merchants do not accept payment with checks because of the risk that there are inadequate funds in order to obtain payments on such checks. In addition, in many cases, the account number for a checking account may be obtained by unauthorized persons which can result in fraudulent withdrawals from the checking account.

Credit and debit cards are payment methodologies which allow for payment to vendors at the point of sale without the physical transfer of funds. In the case of debit cards, a preexisting account is electronically debited at the point of sale based upon the amount of the sale. In the case of a credit card, the payment amount is posted to the credit card authorizing bank, which makes payment and then charges the credit card holder for the amount charged. In case of both credit cards and debit cards, there is a requirement that the credit card or debit card holder have a relationship with the financial institution issuing the cards. This may require establishing an account in a case of a debit card or require pre-approved credit in the case of a credit card. Both of these payment systems are subject to fraud to the extent that debit card numbers and credit card numbers can relatively easily fall into hands of unauthorized persons. The concern over unauthorized use of debit or credit cards has caused a significant number of debit and credit card holders not to carry out transactions on the Internet or by telephone for fear of fraud and loss of personal data.

Each of the non-cash payment methodologies described above require that the person seeking the monetary instrument comply with various prerequisites which are established by the financial institutions. These prerequisites include, for example, a permanent address, an established job, a minimum income and a minimum amount of deposits. If applicants do not meet these prerequisites, the financial institution will generally reject the applicant for credit or debit card.

Thus, the conventional payment methodologies suffer from a variety of problems, including difficultly for some applicants to meet various prerequisites set by financial institutions, difficulty in handling larger monetary transactions, as well as the high possibility of fraud and misuse. For these reasons, it is desirable to establish a payment system and methodology that permits payment of both large and small amounts of money in a secure manner and which has fewer prerequisites for applicants. It is also desirable to establish a payment methodology that gives account holders the ability to control the amount of money that is accessible for payment, as well the time period during which payment can be made. A payment system and methodology that addresses these inadequacies would attract a significant number of new users to financial institutions as well as new customers for various on-line and telephone transactions.

In addition to the payment instruments described above, there are a number of additional payment instruments that are inherently not secure. For example, gift cards, telephone cards and other pre-paid cards are essentially cash equivalents that can be easily lost or stolen. Once lost or stolen, these instruments can be used by unauthorized persons. For example, a department store gift card is essentially equivalent to cash and can be used by anyone who comes into possession of it. Thus, a system and method that provides greater security for pre-paid instruments would be very desirable.

Also, in many countries, companies may pay part of their employees salaries with special checks that can be redeemed at certain food stores, restaurants and gas stations. These paper checks are 'cash instruments' that can be exchanged for the specific goods or services to which they are directed. These types of paper checks are easily lost, stolen or destroyed, which diminishes their potential value to the holder. In addition, the companies who provide such checks must go through certain authorizations and approvals before such checks can be issued. Thus, it is desirable in such circumstances to provide a secure payment system and methodology.

SUMMARY OF THE INVENTION

The invention provides a solution to the security concerns that are raised by existing payment instruments by providing a system and methodology for facilitating secure payments for a variety of commercial transactions. In accordance with the invention, a Chargeable and Dischargeable Security System (CDS) is provided that permits users/account holders to establish a secure account for making payments. The user/account holder can establish two accounts which are assigned two different pin numbers. The first account or core account acts as general account which the user/account holder can access for making deposits and withdrawals. The first account also has an associated pin number that can be used to access and make deposits into the second account. The second account is a controlled account that is governed by access rules set up by the user/account holder. These access rules may include instructions for automatically discharging/returning funds to the first account and/or setting a cap on the amount of funds that may be transferred and/or withdrawn from the second account. The second pin number provides access to the second account so that funds can be manually discharged from the second account and returned to the first account. In this manner, the second account is only funded until discharged of funds automatically or manually using the second pin number.

In accordance with one embodiment of the invention, a Chargeable and Dischargeable Security Instrument (CDS-instrument) is provided. The CDS-instrument may be any type of payment instrument such as a debit, credit card or check card (CDS-card) or any type of pre-paid card, including a pre-paid telephone card (CDS-phone card). The CDS-instrument is associated with and is capable of accessing the second account as described above. The CDS-instrument thus may act as a debit or credit card when funds have been transferred from the first account to the second account by the user/account holder. Thus, when the second account is funded, it can be accessed by the CDS-instrument. Alternatively, if the second account has been discharged and does not have any funds, it operates with a balance of zero and then the CDS-instrument cannot be used for any purchasing transactions.

In accordance with the invention, the CDS-instrument can be used by card holders to make payments at various points of sale, including on-line transactions over the Internet. The CDS-instrument is configured to access the second account described above. In accordance with one embodiment of the invention, the CDS-instrument can be used for transactions at any time so long as the second account is funded so that no other information or pin numbers are necessary to complete the transaction. In accordance with another embodiment of the invention, if requested by the bank, the user/account holder must use the second pin number that is associated with the second account in order to make payments using the CDS-instrument. This embodiment adds an additional layer of security because the second pin must be used in order to make payments using the CDS-instrument.

In accordance with an embodiment of the invention, the second account will automatically be discharged and its funds transferred back to the first account at a predetermined time interval. For example, in one embodiment, the CDS-instrument will discharge within 24 hours of being charged (i.e., when the funds were transferred from the first account to the second account using the first pin number). Thus, the CDS-instrument is rendered unusable once it is discharged and has a balance of zero. In accordance with another embodiment of the invention, the user/account holder can set the time interval for discharge. For example, the user/account holder can instruct that the second account remain funded for 72 hours before it is discharged; thus, in this embodiment, the CDS-instrument can be used during the 72 hour period when the second account is funded. Once the second account is discharged, then the CDS-instrument is unusable. In accordance with another embodiment of the invention, the customer can manually discharge the second account so that the CDS-instrument is unusable. The customer can accomplish this by using the second pin number to access the second account and to instruct that the second account be discharged. This embodiment is particularly pertinent in the event that the CDS-instrument is lost or stolen. In such an instance, the customer can immediately discharge the second account rendering the CDS-instrument unusable, thus preventing unauthorized use of the CDS-instrument.

Thus, in accordance with the invention, the CDS-instrument can be rendered usable or unusable at any time by the user/account holder. When the second account is not funded, the CDS-instrument essentially acts as having a zero balance and cannot be used to make any payments. When the second account is funded, the user/account holder can use the CDS-instrument to access those funds.

In accordance with the invention, there are a variety of methods for charging the CDS-instrument. In accordance with one embodiment of the invention, a user/account holder (subject or not to credit) can make a direct deposit at a financial institution for any desired amount sufficient to cover all purchases that the account holder wishes to make using the CDS-instrument. In this embodiment, the funds remain in the general account of the bank, thus there is no need to open a personal bank account. The user/account holder will then be assigned an account reference number (Account Number "1".) and a Personal Identification Number (pin "1"), as well as with a CDS-card, that will be linked to a second account, Account Number "2" and pin "2". Using his/her pin 1, the user/account holder will charge his/her CDS-card with the amount of funds needed to carry out his/her purchasing operations. The user/account holder can then make purchases using the CDS-card. Once the purchase operation is completed, as explained above, the balance of the CDS-card, if any, will be discharged into Account Number 1, either automatically or manually by the client using his/her pin 2. In this embodiment, the user/account holder can control the amount of funds that are accessible to the CDS-card. In addition, in this embodiment, the account holder does not have to set up a personal account with the financial institution, but instead can deposit and withdraw funds from the financial institution's core account.

In accordance with another embodiment of the invention, a user/account holder (subject to credit) will request a CDS-card from his/her financial institution. This CDS-card will have its corresponding pin 2 and will be linked with the user/account holder's line of credit (such as credit or debit card) or with his/her checking account. Then, and when needed, the user/account holder will charge his/her CDS-card with the desired amount from his/her line of credit, credit or debit card or from his/her checking account. This transfer would be done through the bank's web page or by telephone, using his/her preexisting pin (for purposes of this document "pin 1"). Once the purchases have been made, the same discharge procedure as with the cash deposit model described above takes place using his/her "pin 2"

In accordance with another embodiment of the invention, an individual living and/or working abroad, can make deposits to a CDS-card number given to him by his relatives, whom can then dispose of those funds in their own country (international regulations in this field must be taken into consideration).

It should be understand that the embodiments of the invention contemplate a variety or methodologies for user/account holder's to access the first and second accounts and charge the first and second accounts, including via an electronic network, such as the Internet, via a telephone network, or through in person-visits with the institution holding the user/account holder's account, i.e., a financial institution, phone company, etc.

The CDS-instrument in accordance with the invention provides a secure payment system in any transactions involving the payment of money. This includes person to person transactions, mail-order/telephone order transactions and on-line transactions (including on-line purchases and auctions, for example) over the Internet. The invention also has applicability to pre-paid instruments, such as gift cards, gasoline cards and pre-paid telephone cards. The invention also provides security to overseas travelers who are in need of funds but are concerned about the possibility of loss or theft of money.

Thus, the invention provides the benefits of a debit or credit card, while having the ability to operate with a zero balance unless otherwise designated by the user/account holder. This significantly reduces the risk of debit and/or credit card fraud by eliminating open access to the public of a user/account holder's account. For example, if the CDS-card is stolen, it is unusable if the second account has been discharged.

With the secure account in accordance with the invention, any hacker wishing to illegally dispose of a user/account holder's funds or credit would have to know the exact moment at which the a user/account holder charges his/her CDS-card (and get his pin "1") and then know the exact moment at which the a user/account holder makes a purchase transaction (and get his pin "2"). Furthermore, if we take into consideration that the CDS-card can be charged by phone, and that the operations to charge and to discharge de CDS-card will happen at different times and if done through the Internet in different "windows," it would be almost impossible for the hacker to have access to the user/account holder's secret pin information.

Additionally, in accordance with the invention, if a user/account holder loses his/her CDS-card, he/she can always wait for the funds to be automatically discharged or discharge his/her CDS-card him/herself using the second pin number. Then, the a user/account holder can either wait for the issuance of a new CDS-card by his bank (if offered by the bank), or purchase a CDS-card either locally or abroad, if traveling, (with a new pin "2"), and transfer the funds to this new CDS-card (he/she would only need his/her pin "1" to do it).

The invention can be implemented through a variety of mechanisms, including software which provides a software program product for facilitating secure on-line transactions which executes the steps of receiving a request for establishing a first account, the first account having an associated first pin number, receiving a request for establishing a second account, the second account having an associated second pin number, receiving a request for the transfer of funds from the first account to the second account using the first pin number, the second account charging a chargeable and dischargeable payment instrument; and receiving a request to discharge the second account at a predetermined time interval.

Thus, the invention provides a number of advantages, including, offering to the general public, who may or may not have access to credit, a reliable mechanism to pay for products and services and to carry out money transfers; increased security in transactions which results in a significant reduction in fraud; incorporating a new group of customers into the market for 'credit and debit type' cards, including those who may not have access to credit; promoting the expansion of Internet commerce by providing a more secure method for making on-line payments; a simplified payment methodology for overseas travelers; a more secure system for providing gift cards, phone cards, and other pre-paid instruments and providing a safer and less expensive mechanism for remissions made from abroad.

BRIEF DESCRIPTION OF THE DRAWINGS

The accompanying drawings, which are included to provide further understanding of the invention and are incorporated in and constitute a part of the specification, illustrate embodiments of the invention and together with the description serve to explain the principals of the invention. In the drawings.

DETAILED DESCRIPTION OF THE PREFERRED EMBODIMENTS

Reference will now be made in detailed preferred embodiments of the invention, examples of which are illustrated in the drawings.

Figure 1:
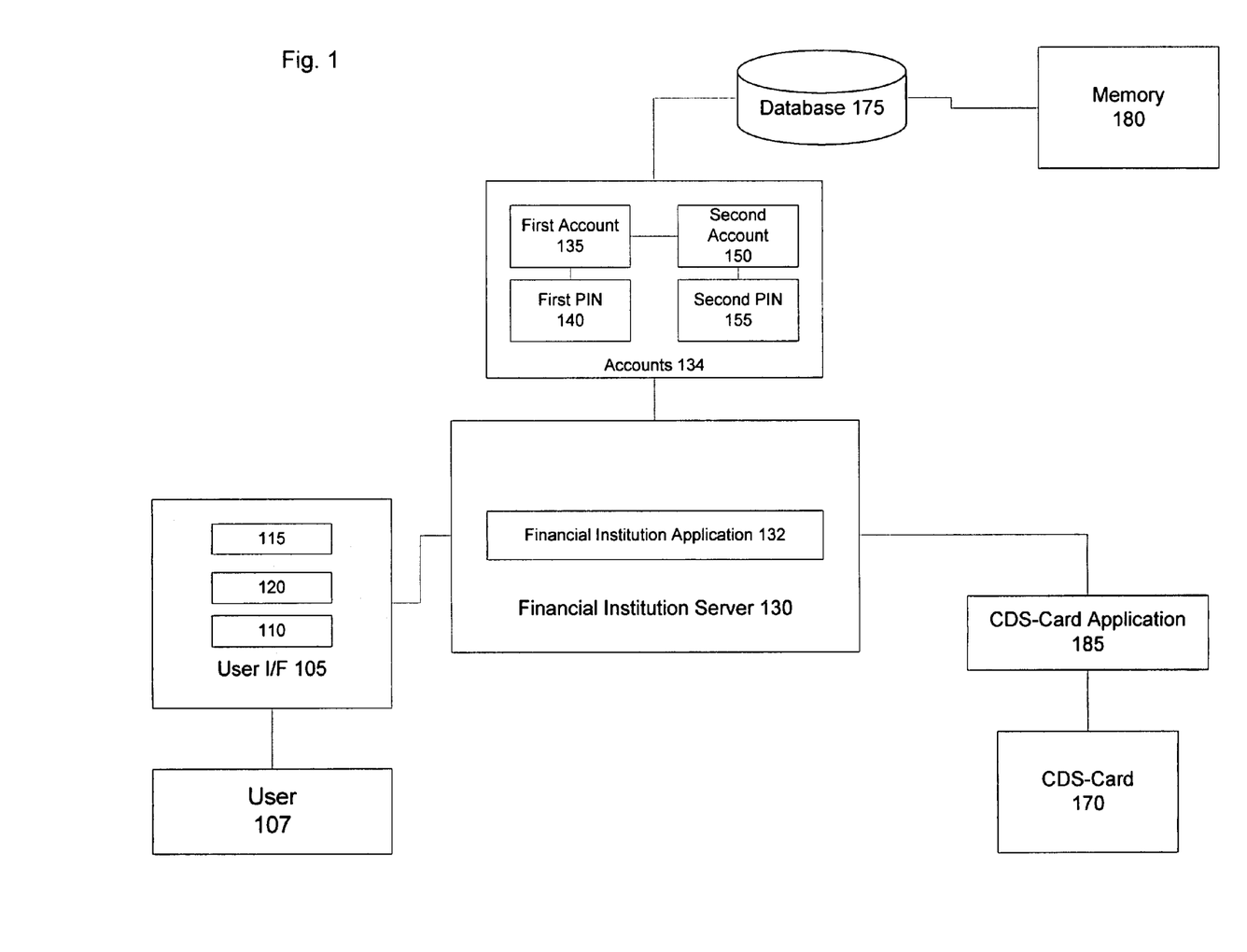
FIG. 1 is a block diagram of the system for secure payment in accordance with an embodiment of the invention.

FIG. 1 shows a system for utilizing the CDS-instrument in accordance with an embodiment of the invention. FIG. 1 shows a financial institution server 130. The financial institution server 130 is operated by a financial institution that is capable of receiving deposits from various users/account holders and establishing accounts for those users/account holders. Such financial institutions are also capable of receiving and processing requests for withdrawal of funds from various client accounts. These financial institutions includes various banks, savings and loans and other financial institutions. As shown in FIG. 1, the financial institution server 130 may include a financial institution application 132. The financial institution application 132 provides functionality for receiving and processing requests from a user interface 110. The application 132 may include a graphical user interface that is presented to the user/account holder as he or she accesses the accounts 135 and 150. The application 132 may also include an authentication application that authenticates the user 107 thus allowing he or she access to the accounts 135 and 150.

FIG. 1 also shows accounts 134 which may include a first account 135 and a first pin number 140 and a second account 150 and a second pin number 155. The first account 135 relates to a first or core account that may be setup by a user/account holder 107 in accordance with the invention. In this account, a user/account holder 107 may deposit a full amount of funds that the user/account holder 107 would like to have held within the account. The first pin number 140, relates to an access code that is required in order for the user/account holder 107 to access the first account 135 so that funds can be transferred from the first account 135 to the second account 150. The second account 150 is an account that is accessible to the user/account holder 107 for making various payments. As described above, the second account 150 receives funds from the first account 135 based upon the first pin number 140. The second account 150 has an associated second pin 155 which allows the user/account holder 107 to access the second account 150 in order to discharge funds from the second account 150 to the first account 135. The accounts 134 are accessible to the account server 130 via the application 132. It should be noted that the accounts 134 may be located at the financial institution server 134, at a data base 175 or at another location (not shown).

In accordance with this embodiment of the invention, a CDS-card 170 is also associated with the second account 150. The CDS-card 170, which may or may not include a magnetic strip or chip, can be used by a cardholder to access the second account 150. In one embodiment of the invention, the cardholder can use the CDS-card 170 for transactions as long as the second account 150 is funded. In another embodiment of the invention, the second pin number 155 is used in conjunction with the CDS-card 170 in order to make payments. FIG. 1 also shows a CDS-card application 185. The CDS-card application 185 provides various functionality for carrying out transactions with the CDS-card 170, including facilitating acceptance of the CDS-card 170 by merchants for completing payment transactions, as well as functionality for accessing the second account 150.

FIG. 1 also shows a user interface 105 which may be used by a user/account holder 107 to access the financial institution server 130. The user interface 105 includes a processor 110, a browser 115 and a database 120. In this embodiment, the user/account holder 107 accesses the financial institution server 130 electronically via a network such as the Internet (not shown). However, it should be understood that in various embodiments of the invention, the user/account holder 107 may use other mechanisms for accessing a financial institution, including a telephone or direct in-person visit to the financial institution. In FIG. 1, the processor 110 is able to process a request by a user/account holder to set up a first account 135 and also to transfer funds and authorize payment through a second account 150. The browser 115 is one mechanism that allows the user/account holder 107 to access both the first and second accounts 135 and 150. As will be described in greater detail below, the second account 150 is accessible for payments using the CDS-card 170 as long as the second account 150 remains funded. In FIG. 1, the database 120 stores relevant information including information about the consumer's financial condition.

FIG. 1 also shows an account database 175 coupled to the financial institution server 130. The account database 175 may be a single database that includes various information about the first account 135 and the second account 150, such as the balance residing in each respective account. The account database 175 may also be coupled to a memory 180. While the account database 175 is illustrated as a single database, it should be understood that it may include a plurality of databases, including, for example, one assigned to the first account 135 and a second assigned to the second account 150. FIG. 1 also shows a memory 180 coupled to the database 175 for storing various data residing in the database 175.

As described above, FIG. 1 also shows a CDS-card 170. The CDS-card 170 is associated with the second account 150 and thus is useable so long as the second account 150 remains funded. When the second account 150 is discharged, the CDS-card 170 has a zero balance and is therefore unusable. The CDS-card 170 may be configured so as to discharge at certain predetermined time intervals or may be manually discharged using the second pin 155.

In operation, a user/account holder 107 wishing to establish a secure payment system in accordance with the invention may, via browser 115 access the financial institution server 130. As described before, in this embodiment, the user/account holder 107 is accessing the financial institution server 130 via the internet, however, other embodiments of the invention contemplate a consumer directly visiting the financial institution in-person and/or contacting the financial institution by telephone or other mechanism. Returning to this embodiment, the user/account holder 107 using the browser 115 may access and create a first account 135 using tools that may be provided by the application 132. This allows a user/account holder 107 to set up an account within a financial institution. This account may be like a checking account in a conventional financial institution. The account may be assigned a first pin number 140 which is uniquely associated with the first account 135. The user/account holder 107 can also access the first account 135 in order to make future withdrawals and deposits via the user interface 105.

The user/account holder 107 can also set up the second account 150 using the browser 115. The user/account holder 107 can make deposits from the first account 135 to the second account 150 using the first pin 140. The CDS-card 170 is useable so long as the second account 150 is funded. The user/account holder 107 can manually discharge the second account 150, and thus render the CDS-card 170 unusable by using the second pin 155. In accordance with the invention, this manual discharging of the second account 150 can be accomplished via the user interface 105 or by contacting the financial institution in some other manner, such as via telephone. Discharging the second account 150 results in funds being transferred back to the first account 135. In this manner, the user/account holder 105 can control to whom and when payments are made in a secure manner. The risk of fraud is limited because the second account is not funded at all times.

Figure 2:
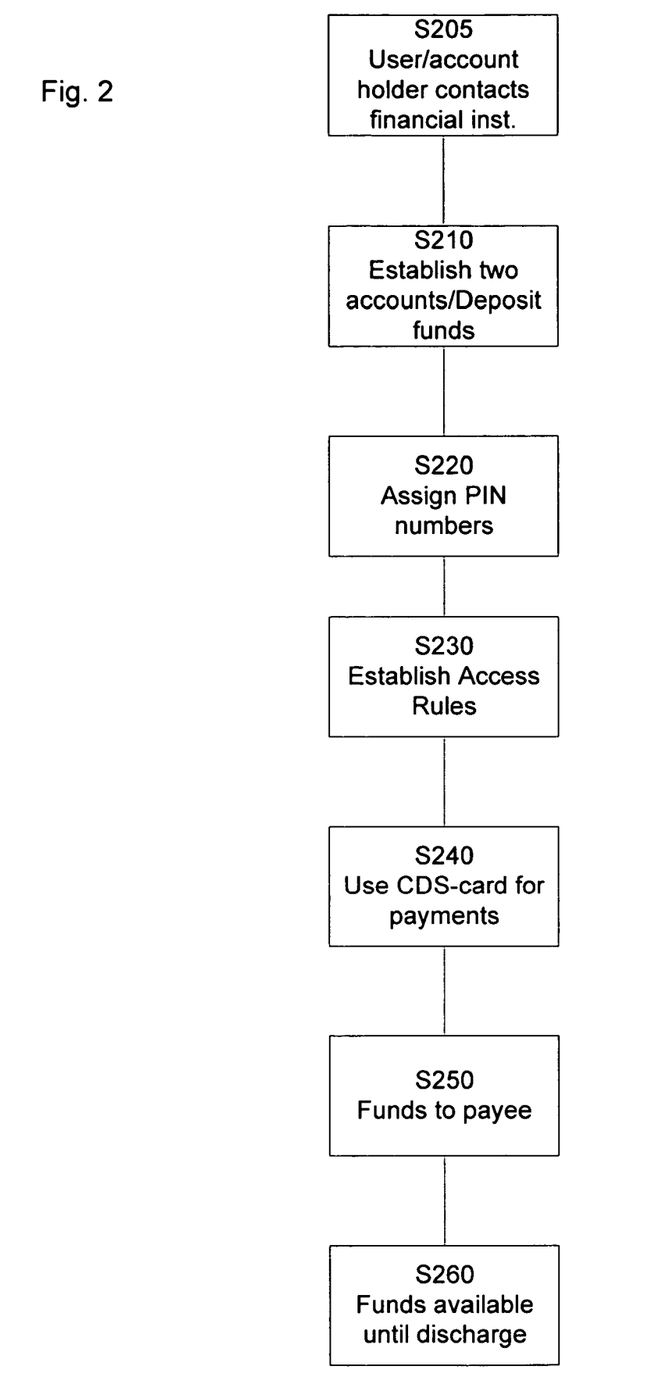
FIG. 2 is a flowchart illustrating a process for facilitating secure payments in accordance with an embodiment of the invention.

FIG. 2 illustrates a process for establishing a secure payment account in accordance with embodiment of the invention. In FIG. 2, the process begins at step S205. In step S205, a user/account holder contacts the financial institution to establish the two account system in accordance with the invention. The process then moves to step S210. In step S210, two accounts are established and the user/account holder deposits funds into the first account. The process then moves to step S220. In step S220, the two account numbers are assigned pin numbers (a first and a second pin number) which are required for access to the two accounts. The process then moves to step S230.

In step S230, a user/account holder wishing to activate the CDS-card establishes access rules for the second account. These access rules may include discharge rules which govern when the second account is funded and/or not funded and thus when the CDS-card can be used or not used, as well as monetary limits on how much can be spent using the CDS-card. Thus, for example, the second account may be configured to be charged (funded) on October 5 for 10 hours, after which it is discharged, and authorized for payments of up to $100 during the time period when it is funded.

The process then moves to step S240 in which the user/account holder uses the CDS-card to make payment. In this manner, payments are made. The process then moves to step S250.

In step S250, the funds are transferred from the second account to the payee in an amount authorized by the user/account holder. At this time, payment is complete and the process moves to step S260 where the remaining funds are available for additional purchases until they are discharged and returned to the first account in accordance with the discharge rules.

Figure 3:
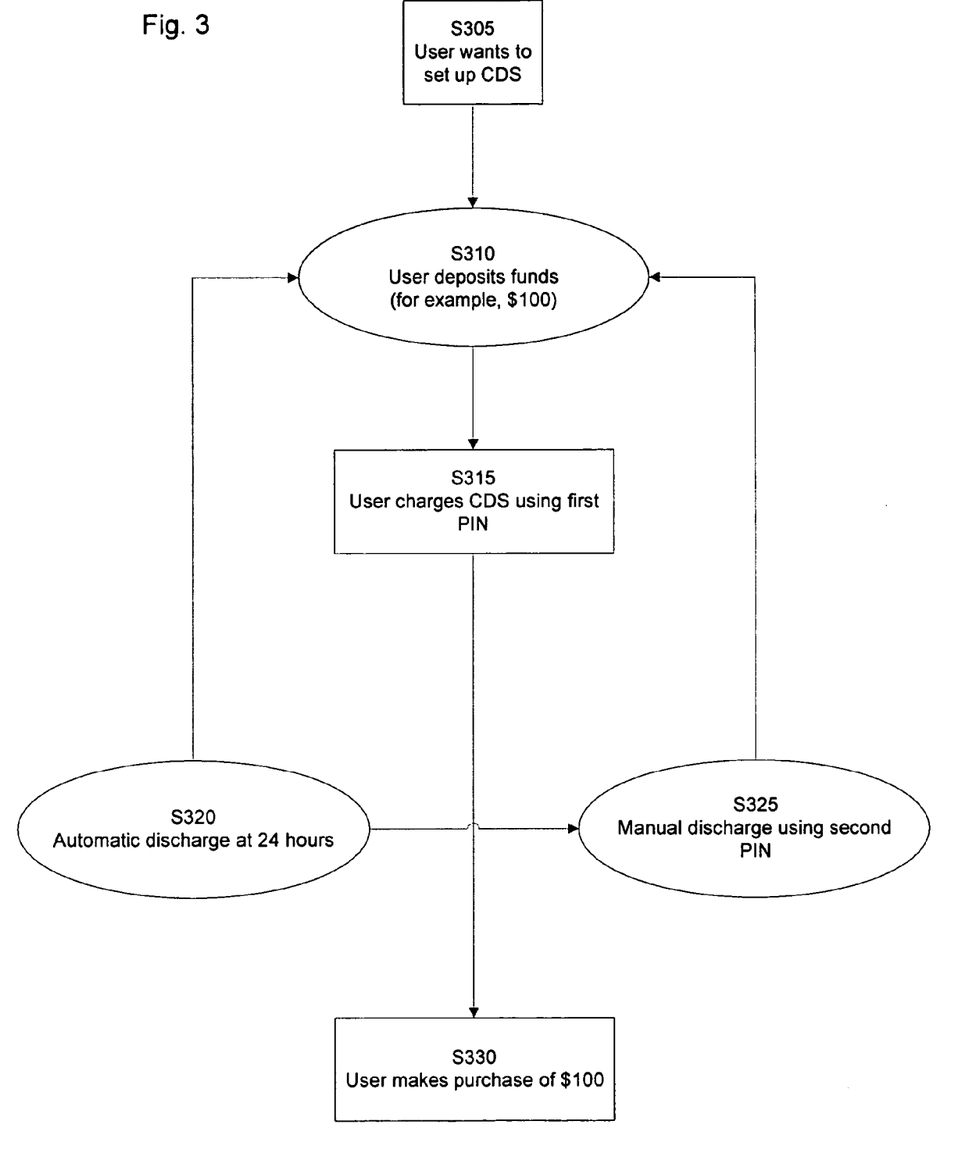
FIG. 3 illustrates an example of a first model for charging the CDS-card in accordance with an embodiment of the invention.

As described earlier, the invention provides various methodologies for establishing the first or core account, including a cash model, a line of credit model and a checking account model. FIG. 3 illustrates an example of the cash model. In this example, at S305, the user/account holder wants to set up a CDS-instrument in order to carry out secure transactions. The user/account holder initiates the process by depositing funds into a financial institution's general account, S310. In this embodiment, the user/account holder may not have any pre-existing relationship with the bank. As shown in the example of FIG. 3, the user/account holder has deposited $100 into the general account of the bank. At this time, the user/account holder is also provided with two pin numbers, a first pin number that can be used to transfer funds from a first account to a second account, so that the CDS-instrument is charged, and a second pin number for discharging the second account which also discharges the CDS-instrument. As shown in FIG. 3, at S315, the user/account holder can charge the CDS-instrument using the first pin, which transfers funds from the first account to the second account. In accordance with one embodiment of the invention, the discharge rules may be predetermined so that the CDS-instrument is discharged automatically after having been charged for a certain period of time, for example the CDS-instrument may discharge 24 hours after being charged, S320. Alternatively, the user/account holder, using the second pin, can specify a time when the CDS-instrument is discharged and thus rendered unusable, S325. During the time when the CDS-instrument is charged, it can be used to make purchases up to the amount of funds that reside in the second account, for example up to $100 as shown in S330.

Figure 4:
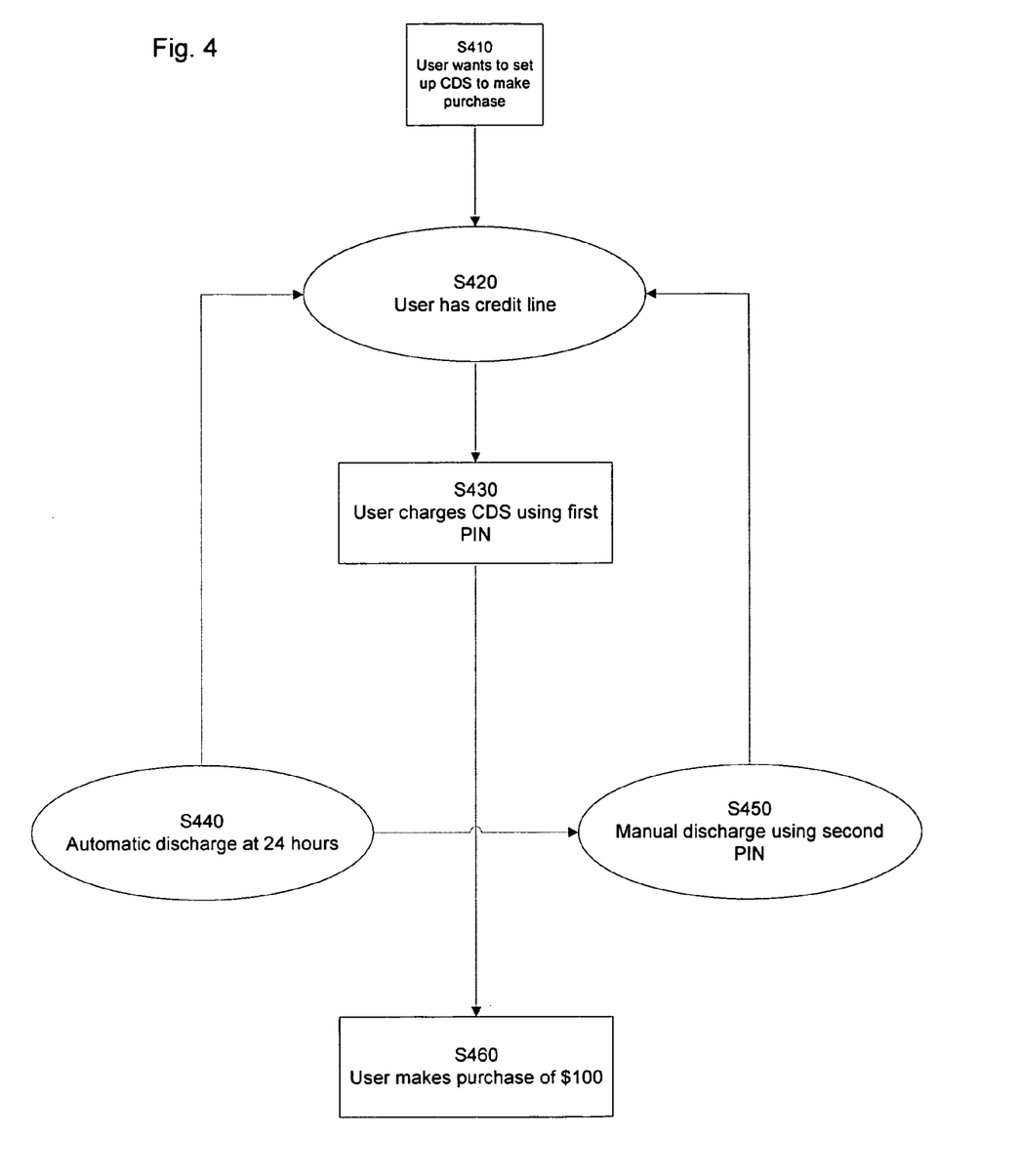
FIG. 4 illustrates an example of a second model for charging the CDS-card in accordance with an embodiment of the invention.

FIG. 4 illustrates a line of credit model for charging and discharging the CDS-card in accordance with an embodiment of the invention. In this example, the user/account holder has a line of credit which may include a payment instrument such as a credit or debit card for making payments. As shown in FIG. 4, the user/account holder wants to carry out a purchase, for example a $100 purchase, S410. The user/account holder has an available line of credit, S420. The user/account holder accesses the line of credit and charges the CDS-instrument by telephone or on-line using the first pin number associated with the first account, S430 The CDS-instrument is now funded and can be used for purchases. The CDS-instrument may be configured to discharge, and thus be unusable, automatically at a predetermined interval, such as 24 hours after being charged, S440. Alternatively, using the second pin number, the user/account holder can manually discharge the CDS-instrument, S450. While charged, the CDS-instrument can be used by the account holder to make purchases up to the amount of the available funds deposited in the second account, S460. It is important to note in this example that the account holder is using an existing line of credit to charge the second account and in turn the CDS-instrument.

Figure 5:
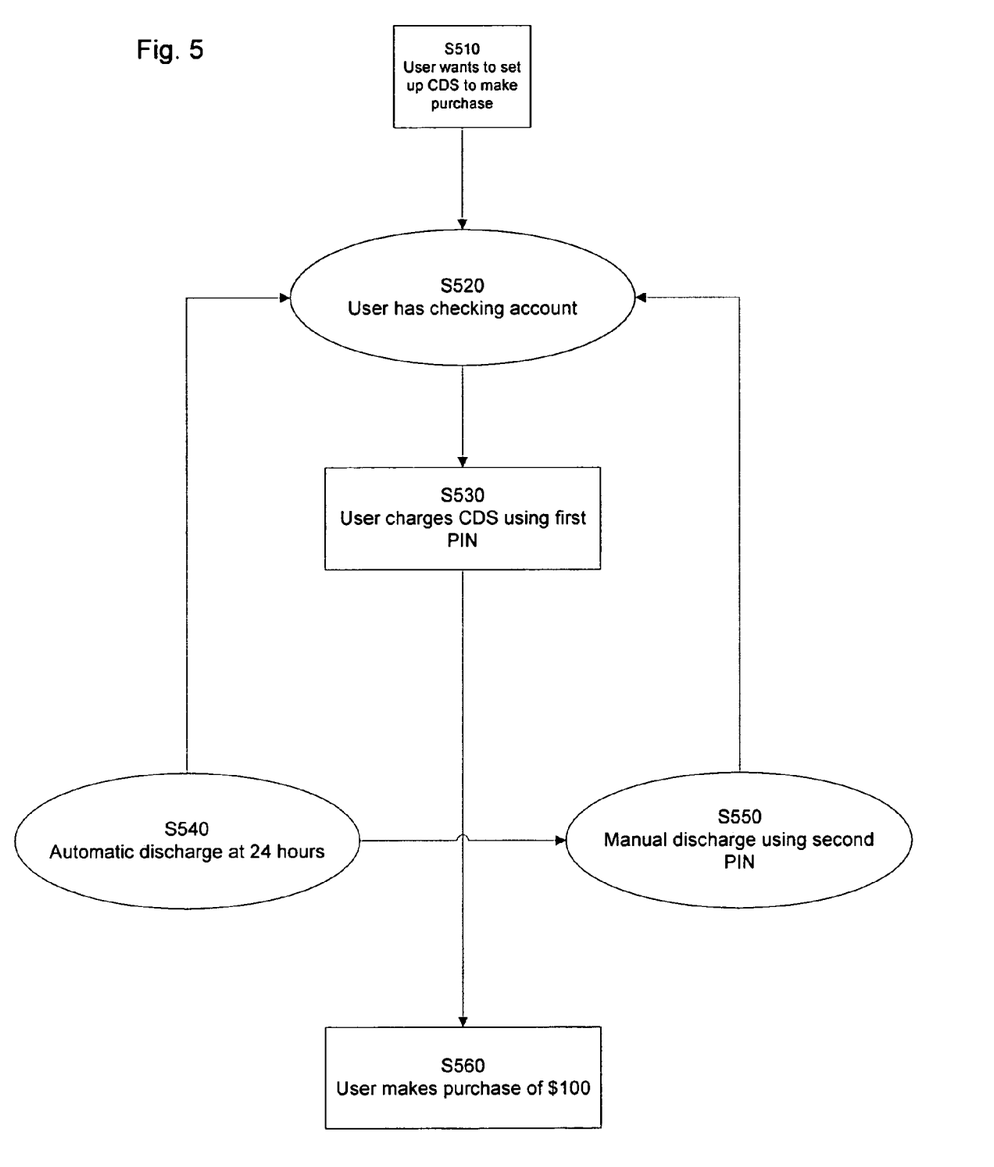
FIG. 5 illustrates an example of a third model for charging the CDS-card in accordance with an embodiment of the invention.

FIG. 5 illustrates a checking account model for charging and discharging the CDS-instrument In this example, the user/account holder has an existing account with a financial institution. As with the examples described above, in this example, the user/account holder wants to carry out a purchase of $100, S510. The user/account holder has an existing checking account with a financial institution, S520. The user/account holder then accesses the first account and, using the first pin number, transfers money to a second account, which is accessible by the CDS-instrument, S530. Thus, the CDS-instrument is now charged for as long as the second account remains funded. In one embodiment, the second account is automatically discharged within 24 hours of being charged, S540. In another embodiment, the user/account holder can manually discharge the second account, thus disabling the CDS card, using the second pin, S550. While the CDS-instrument is charged, the user/account holder can make purchases up to the amount of money deposited in the second account, S560.

Figure 6:
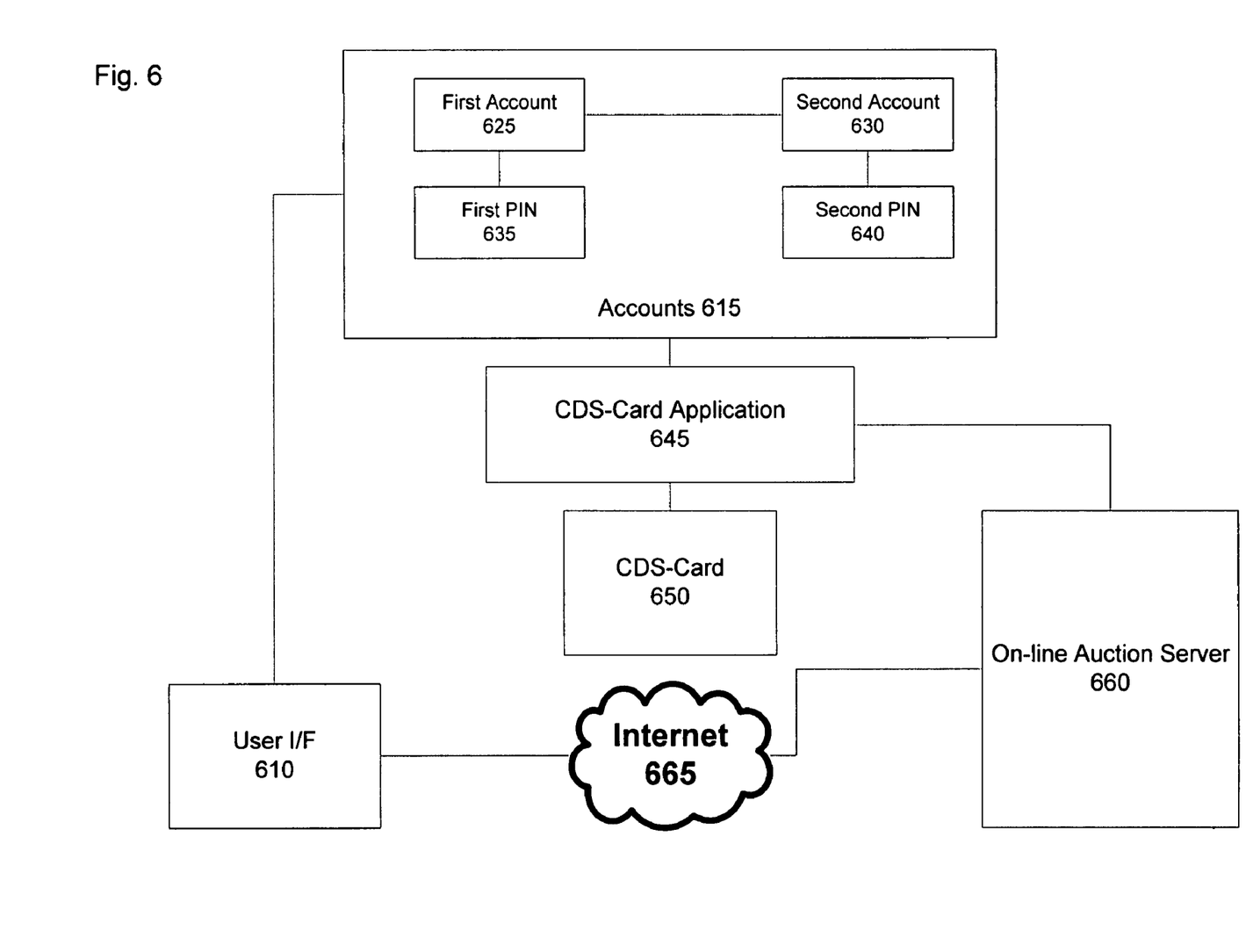
FIG. 6 is a block diagram of a electronic auction that utilizes the payment system in accordance with the invention.

FIG. 6 illustrates an application of the CDS-system in accordance with another embodiment of the invention. In the example shown in FIG. 6, a user/account holder is using the CDS-instrument in order to participate in an on-line auction. FIG. 6 shows an user/account holder interface 610. The user/account holder interface 610 may be any known device, such as a computer having a monitor and keyboard that can be used by the user/account holder to access a network, such as the Internet 665. FIG. 6 also shows the on-line auction website 660 which hosts the on-line auction. The user/account holder interface 610 may be used to access the on-line auction website 660 via the Internet 665 by using a browser (not shown) which is provided at the user/account holder interface 610. FIG. 6 also shows a accounts 615 which includes a first account 625 and a second account 630. The first account 625 has a first pin number 635 associated with it and the second account 630 has a second pin number 640 associated with it. The first pin number 635 is used by the user/account holder to facilitate the transfer of funds from the first account 625 to the second account 630. The second pin number 640 is used by the user/account holder to manually discharge the second account 630 which results in funds being returned back to the first account 625 from the second account 630. The accounts 615 may reside in a financial institution's records or database.

FIG. 6 also shows a CDS-card 650 that is associated with the second account 630. The CDS-card 650 is usable when the second account 630 is funded. The CDS-card 650 may act as a credit or debit card and can be used to make purchases until the second account 630 is discharged. When the second account 630 is discharged, it has a zero balance, which results in the CDS-card 650 (having a zero balance and, thus) being unusable.

In the embodiment of FIG. 6, the user/account holder has logged into an on-line auction service hosted by the auction website 660. The user/account holder participates in the on-line auction via the user/account holder interface 610. The user/account holder may make bids in an effort to purchase certain goods and services being offered by the on-line auction service. Typically, in an on-line auction, there is an open period during which bids will be accepted from a number of bidders. Once the open bidding has ended, the highest bidder wins. If the bidder wins the auction, he or she is then asked to make payment for the goods. In accordance with the invention, a winning bidder can charge the CDS-card up to the amount of his or her winning bid by transferring funds from the first account 625 to the second account 630. The amount of funds transferred will be the exact amount of the winning bid. The seller will be provided with the user/account holder's CDS-card number so the second account 630 can be debited in the amount of the winning bid. Once debited, the second account 630, and hence the CDS-card 650 has a zero balance, and is unusable. In this manner, the CDS-card 650 is charged only for a brief period of time, that is from the time the winning bidder charged the CDS-card 650 in order to make payment, until it is debited by the seller. This provides a highly secure manner for facilitating on-line purchases because the CDS-card is charged only up to the amount of the winning bidder's bid and is only charged upon notification that the account holder has won the auction. Thus, the account holder's entire account or line of credit is not exposed to potential hackers. FIG. 6 also shows a CDS-card application 645 which provides functionality for utilizing the CDS-card in payment transactions.

Figure 7:
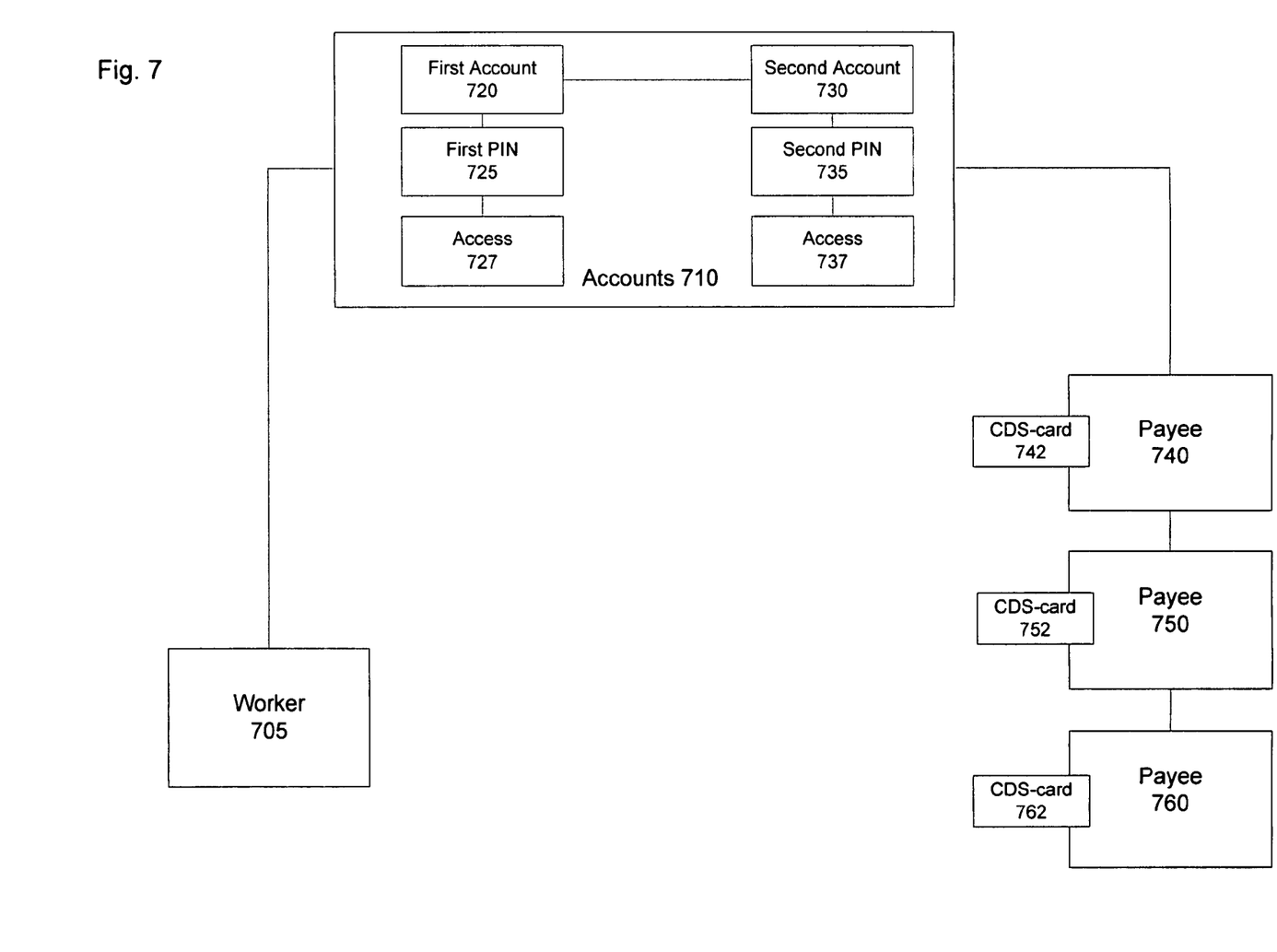
FIG. 7 illustrates a remissions system in accordance with an embodiment of the invention.

FIG. 7 illustrates another embodiment of the system for facilitating secure payments to third parties in accordance with the invention. In this embodiment, a remissions example is illustrated. This embodiment describes those situations where an individual is working or living abroad and wants relatives, friends or other payees in his or her home country to have secure access to funds. FIG. 3 shows a worker 705 who is working or visiting a foreign country (visiting country). The worker 705 is employed in the visiting country and wishes to transfer funds to a payee 740, which may include relatives, friends or other payees who are located in his or her home country. The payee 740 holds a CDS-instrument, such as a CDS-card 742 (credit or debit) which can be used to make payments when it charged. FIG. 3 also shows accounts 710 which includes a first account 720 and a second account 730. The first account 720 is associated with a first pin number 725 and the second account 730 is associated with a second pin number 735. FIG. 3 also shows that the first account 720 is associated with a first access program 727 and the second account is associated with a second access program 737. The access programs 727 and 737 regulate access to the accounts 720 and 730. FIG. 7 also shows additional payees 750 and 760 having associate CDS-cards 752 and 762, respectively.

In this embodiment, the worker 705 can establish accounts 720 and 730 as described above with the financial institution 710. The financial institution 710 can be located either in the country where the worker 705 is located or in the home country where the payee 740 resides. The worker 705 can establish the first account 720 or core account and the second account 730. The first account 720 is the worker's primary account and holds all deposits by the worker 705. Using the first pin number 725, the worker can access the first account 720 to facilitate a transfer of funds from the first account 720 to the second account 730. When the second account is funded, the CDS-card 742 is now charged and can be used by the payee 740 to make purchases. In accordance with one embodiment, the CDS-card 742 remains charged for a predetermined amount of time, for example 24 hours after being charged, In this case, the payee 740 has 24 hours to make purchases using the CDS card 742. After the 24 have passed, the funds from the second account 730 are transferred back to the first account 720 so that the second account 730 has a zero balance. Thus, the CDS-card 742 is discharged and cannot be used for any further purchases.

In accordance with another embodiment, the payee 740 can manually discharge the CDS-card 742 using the second pin number 735. This also results in the CDS-card 742 being unusable. The ability to manually discharge the CDS-card 742 is particularly useful in the case where the CDS-card 742 is lost or stolen.

It is important to note that various access rules can be configured for the different payees 740, 750 and 760. For example, in one embodiment, the worker 705 has access to both the first pin number 725 and the second pin number 735, while the payee 740 has access to only the second pin number 735. This means that only the worker 705 has the ability to transfer funds from the first account 720 to the second account 730 (and thus charge the CDS-card 742), while both the worker 705 and the payee 740 can discharge the CDS-card 742 using the second pin number 735.

In accordance with another embodiment, both the worker 705 and the payee 740 have access to both the first and second pin numbers 725 and 735. In this embodiment, both the worker 705 and the payee 740 can transfer funds from the first account 720 to the second account 730 via the first pin number 725. They both can also discharge the second account 730 by using the second pin number 735.

In accordance with another embodiment of the invention, the first account may have a subaccount which is accessible to the payee 740. Thus, for example, the first account 720 may have a balance of $10,000, which includes a subaccount of $2,000. In this embodiment of the invention, the worker 705 has access to the first account (i.e., $10,000), while the payee has access to the subaccount (i.e., $2,000). Thus, the worker 705 can transfer funds from the first account 720 to second account 730. However, the payee 740 will be given a new subaccount pin number which can be used to transfer funds from the subaccount to the second account 730. Therefore, in this embodiment, the worker 705 gives the payee access to some funds from the first account 720 (which are located in the subaccount), but not all of those funds. The subaccount is essentially a subset of the first account.

As shown in FIG. 7, there may be multiple payees 740, 750 and 760. Each of the different payees 740, 750 and 760 may be governed by different access rules. For example, the payee 740 may be a spouse of the worker and may be given both pin numbers 725 and 735 so that he/she can transfer funds into the second account as well as discharge the second account 730. The payee 750 may be a child of the worker who is only given the second pin number 735 so that he or she may manually discharge the second account 730 (for example, in the event that the CDS-card 752 is stolen). The payee 760 may be a non-related person to whom the worker 705 may want to transfer funds. In this case, the payee 760 may be given no pin numbers and thus have no ability to charge or discharge the second account 730. In this manner, the system in accordance with the invention can be configured to adapt to a variety of situations depending upon the amount of control that the worker 705 wants to give to the payees 740, 750 and 760.

Figure 8:
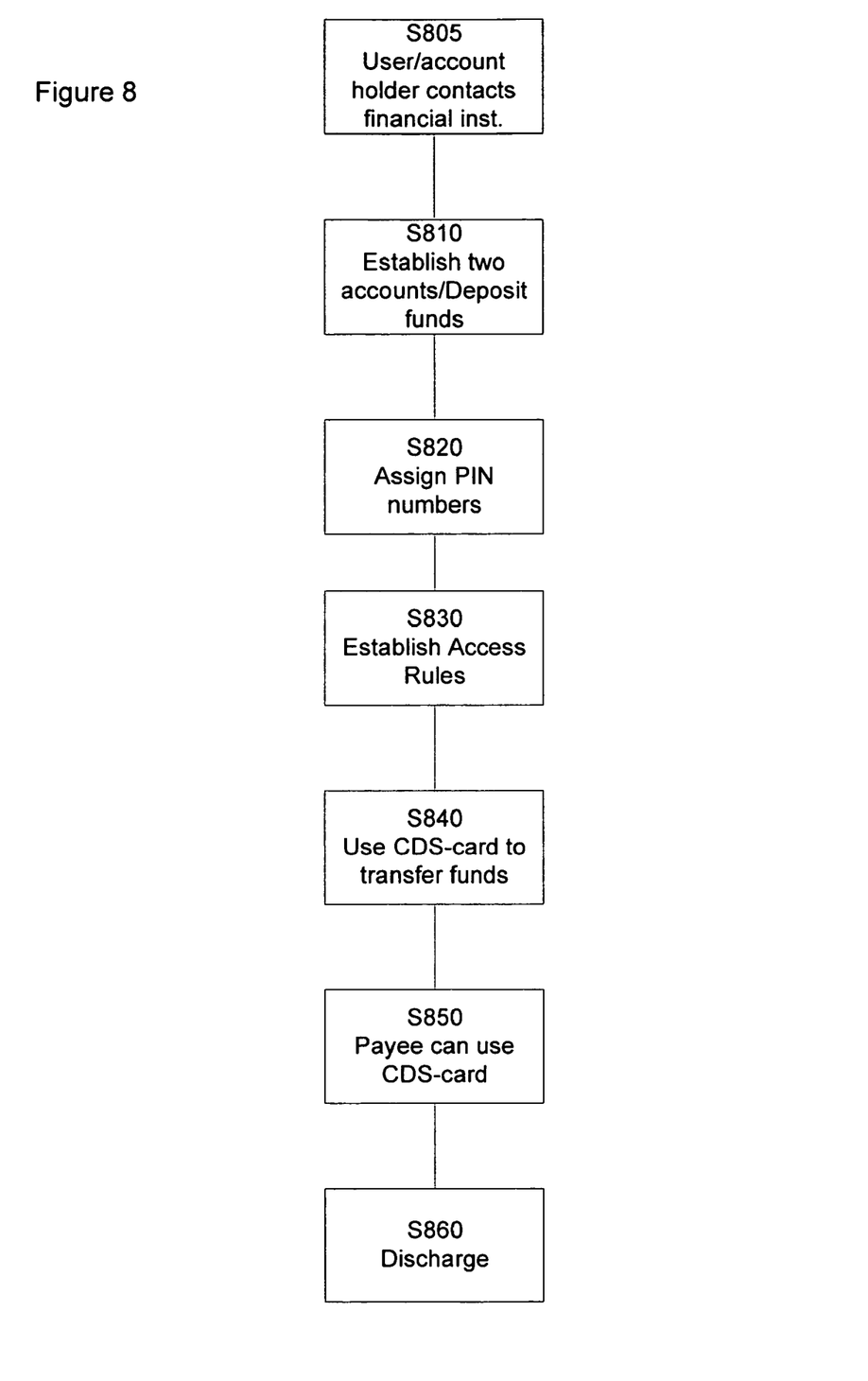
FIG. 8 is a flowchart illustrating a process for a remissions model in accordance with an embodiment of the invention.

FIG. 8 illustrates a flowchart of the remissions process in accordance with an embodiment of the invention. In FIG. 8, the process begins with step S805. In step S805, a worker contacts a financial institution in order to establish the two account system in accordance with the invention. The process then moves to step S810. In step S810, two accounts are established and the worker deposits funds into the first account. The process then moves to step S820. In step S820, the two account numbers are assigned pin numbers (a first and a second pin number) which are required for access to the two accounts. The process then moves to step S830.

In step S830, a worker wishing to activate the CDS-card establishes access rules for the second account. These access rules include when the second account will be automatically discharged, as well as a monetary limit on how much can be spent using the CDS-card.

The process then moves to step S840 in which the worker use the first pin to access the first account and transfer funds to the second account, thus charging the CDS-card. The process then moves to step S850 where the payee can use the CDS-card to make payments up to the amount that the CDS-card has been charged.

In step S860, the payee can either manually discharge the CDS-card using the second pin, or the CDS-card is automatically discharged at a predetermined time from the time when it was charged. The process then ends as the CDS-card is not unusable until it is charged again.

As illustrated above, the CDS system in accordance with the invention can be used to facilitate a variety of payment transaction, including person to person retail transactions, on-line purchases, auctions as well as for the remittance of funds to persons overseas. In accordance with another embodiment of the invention, the CDS-card may be charged for a single use and cannot be discharged. Importantly, the CDS-system in accordance with the invention can be used in every retail and commercial transaction that requires payment for goods and services. This can include but is not limited food, clothing, gasoline (i.e., the CDS-card could act as a dedicated gasoline card), communications services, transportation services, medical services, legal services, etc. As will be described below in greater detail, the CDS-card can also be implemented as a chargeable and dischargeable telephone card.

Figure 9:
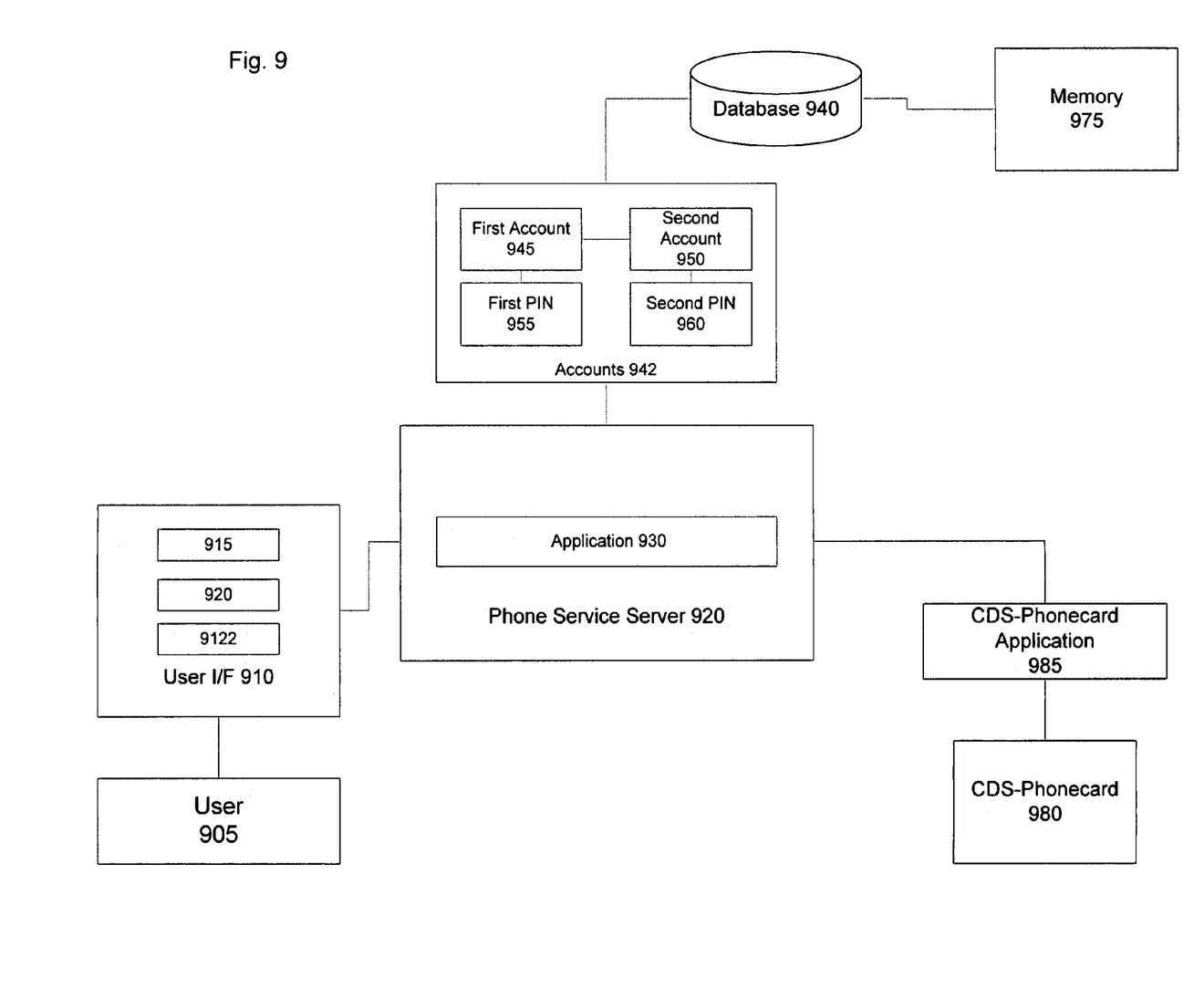
FIG. 9 illustrates a block diagram of a system for utilizing a CDS-phone card in accordance with an embodiment of the invention.

FIG. 9 illustrates another embodiment of the CDS-system which provides a system and method for secure pre-paid telephone services. FIG. 9 shows a user/account interface 910 that can be utilized by a user/account holder 905 in order to obtain a CDS-phone card 980 in accordance with the invention. FIG. 9 also shows a phone service server 920. The phone service server 920 includes a phone card application 930 which provides the functionality for receiving and processing requests from the user interface 930. For example, the phone card application 930 may provide a graphical user interface that is presented to the user/account holder 905 as he or she accesses the phone service server 920. The phone card application 930 may also include an authentication application (not shown) that authenticates the user/account holder 905 thus allowing he or she access to the various accounts. FIG. 9 also shows accounts 942 which includes a first account 945, a second account 950, a first pin number 955 that is associated with the first account 945 and a second pin number 960 that is associated with second account 950. The accounts may reside at the phone service server 920 or at an account database 940. The account database 940 may be a single database that includes various information about the first account 945 and the second account 950, such as the balance residing in each respective account. The account database 940 may also be coupled to a memory 975. While the account database 540 is illustrated as a single database, it should be understood that it may include a plurality of databases, including, for example, one assigned to the first account 945 and a second assigned to the second account 950.

FIG. 9 also shows a CDS-phone card 980 which is chargeable and dischargeable depending on the actions of the user/account holder 905. The CDS-phone card 980 may include a magnetic stripe that can be read by certain pay telephones or may have an account number and/or pin number required to use the CDS-phone card 980. FIG. 9 also shows a CDS-phonecard application 985 provides functionality allowing the CDS-phonecard to be used to access telephone time and also allows access to the second account 950.

In operation, a user/account holder 905 accesses the phone card server 920 using the user interface 910. The user/account holder 905 may be queried about joining the phone card service if he or she is a first time user/visitor. Repeat users will be authenticated. The first account 945 is a core account that holds all of the phone minutes that have been purchased by the user/account holder 905. The user/account holder 905 can then charge the second account 950 with a desired number of minutes by using the first pin 955. At this point, the CDS-phone card 980 is charged and the user/account holder 905 can use the card for up to the full amount of minutes to which it has been charged. The CDS-phone card 980 may be configured so that it automatically discharges at a predetermined time. Alternatively, the CDS-phone card 980 may be manually discharged through by the user/account holder 905 by using the second pin 960. In this manner, the CDS-phone card 980 is only usable if the second account 950 has available minutes allotted to it by the user/account holder 905. Because it remains charged for a limited amount of time, the risk of fraud and/or misuse of the CDS-phone card 980 is significantly reduced.

Figure 10:
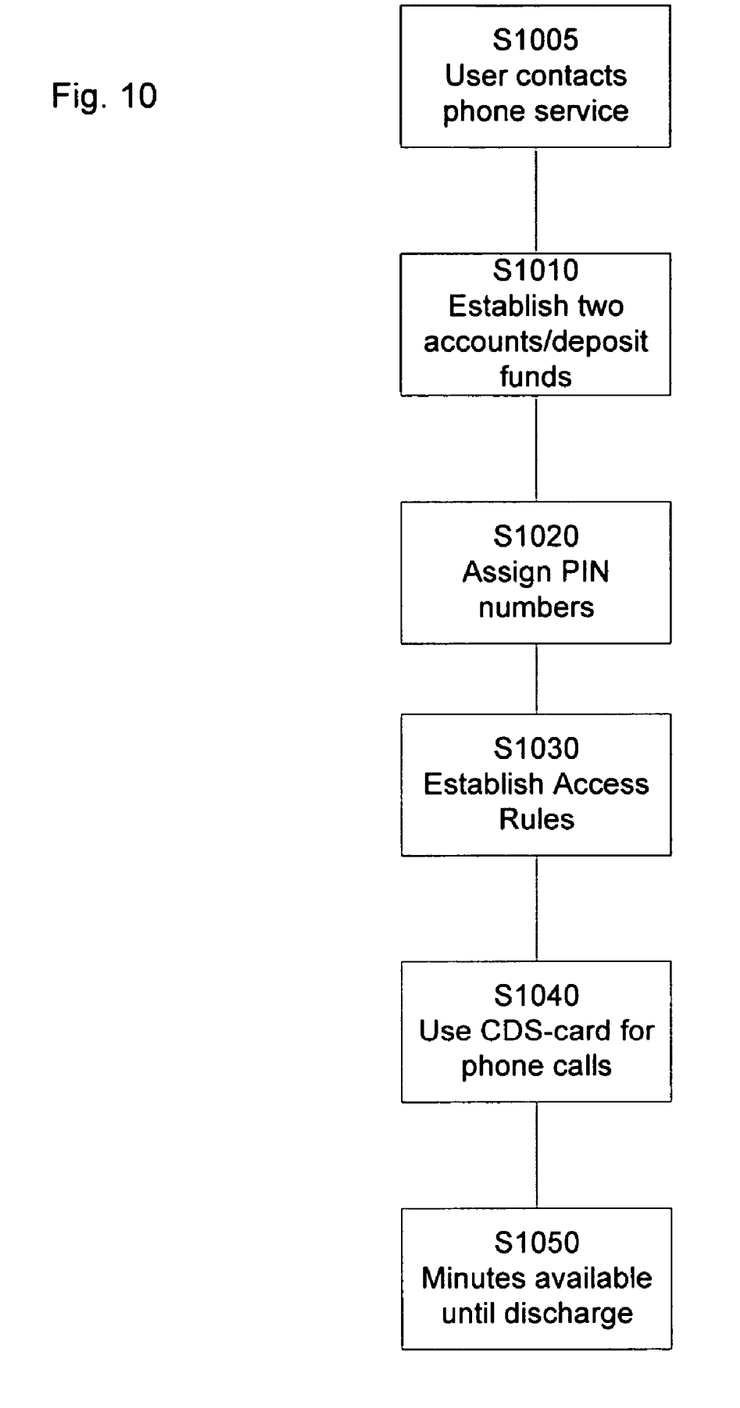
FIG. 10 illustrates a process for utilizing a CDS-phone card in accordance with an embodiment of the invention.

FIG. 10 illustrates a process for configuring and using the CDS-phone card in accordance with the invention. In FIG. 10, the process begins at step S1005. In step S1005, a user/account holder contacts the organization offering prepaid phone services to establish the two account system in accordance with the invention. In this case, the first core account holds all of the pre-paid telephone minutes. The process then moves to step S1010. In step S1010, two accounts are established and the user/account holder deposits funds into the first account. This entitles the user/account holder to a certain number of telephone minutes. The process then moves to step S1020. In step S1020, the two account numbers are assigned pin numbers (a first and a second pin number) which are required for access to the two accounts. The process then moves to step S1030.

In step S1030, a user/account holder wishing to activate the CDS-phone card establishes access rules for the second account. These access rules may include discharge rules which govern when the second account is charged and/or not charged and thus when the CDS-phone card can be used or not used, as well as time limits on how many minutes can be used with the CDS-phone card. Thus, for example, the second account may be configured to be charged on October 5 for 2 hours of telephone access after which it is discharged.

The process then moves to step S1040 in which the user/account holder uses the CDS-phone card to make phone calls. At this time, the telephone calls are complete and the process moves to step S1050 where the remaining telephone minutes are available for additional calls until they are discharged and returned to the first account in accordance with the discharge rules.

The foregoing description of the preferred embodiments of the invention has been presented for the purposes of illustration and description. It is not intended to be exhaustive or to limit the invention to the precise form disclosed. Many modifications and variations are possible in light of the above teaching.

The invention claimed is:

1. A method of facilitating secure financial or point of sale transactions between at least one payer and one payee, comprising executing non-transitory software on a computer having a processor to perform the steps of:
   establishing a first account, the first account having an associated first pin number;
   establishing a second account, the second account having an associated second pin number;
   providing a payment instrument configured to be charged and discharged which is linked and associated only with the second account;
   transferring funds from the first account to the second account using the first pin number, the payment instrument being charged by the step of transferring funds; and
   discharging the second account at a predetermined time interval after the step of transferring funds, the step of discharging including returning the funds from the second account to the first account.

2. The method according to claim 1, further comprising the step of establishing access rules governing access to the second account.

3. The method according to claim 2, wherein the step of establishing access rules includes at least one of selecting an amount of funds to be transferred to the second account and selecting a time at which the second account will automatically be discharged.

4. The method in accordance with claim 3, wherein the payment instrument is at least one of a credit card, a debit card, a check card, a gift card, a telephone card and a card for facilitating remissions.

5. The method in accordance with claim 3, wherein the payment instrument is a single use instrument.

6. The method in accordance with claim 3, wherein the payment instrument can be used in at least one of point of sale retail transactions, commercial transactions, on-line transactions and on-line auctions.

7. The method in accordance with claim 3, wherein the payment instrument is configured to allow the making of payments during the time when the second account is funded and is configured to disallow the making of payments when the second account is discharged.

8. The method in accordance with claim 3, wherein the second account is discharged automatically based upon the access rules.

9. The method in accordance with claim 3, wherein the second account is discharged manually utilizing the second pin number.

10. The method in accordance with claim 3, wherein the second pin number is required at the point of sale in order to configure the payment instrument to allow the making of payments.

11. The method according to claim 2, wherein the step of discharging the second account occurs automatically based upon the access rules.

12. The method according to claim 1, wherein the step of establishing the first account includes accessing a financial institution's server to access an account application.

13. The method in accordance with claim 12, wherein the access rules includes at least one of an amount of funds to be transferred to the second account and a time at which the second account will automatically be discharged.

14. The method according to claim 1, wherein the step of establishing the second account includes accessing a financial institution's server to access an account application.

15. The method according to claim 1, wherein the payment instrument is at least one of a credit card, a debit card, a check card, a gift card, a telephone card and a card for facilitating remissions.

16. The method according to claim 1, wherein the payment instrument is a single use instrument.

17. The method according to claim 1, wherein payment instrument can be used in at least one of point of sale retail transactions, commercial transactions, on-line transactions and on-line auctions.

18. The method according to claim 1, wherein the payment instrument is configured to allow the making of payments during the time when the second account is funded and configured to disallow the making of payments when the second account is discharged.

19. The method according to claim 1, wherein the step of discharging the second account can be performed manually utilizing the second pin number.

20. The method according to claim 1, wherein the second pin number is required at the point of sale in order to configure the payment instrument to allow the making of payments.

21. The method of claim 1 comprising the step of providing a server having a memory for hosting the first or second account information.

22. The method of claim 21 comprising the step of accessing the first or second account information hosted by the server by using a web browser.

23. The method of claim 1, wherein neither the second pin nor the first pin are used at the point of sale.

24. The method of claim 1, comprising the step of using the second pin to transfer money from the second account to the first account.

25. A computer implemented system connected to a network, said system comprising one or more computers for facilitating secure financial or point of sale transactions between at least one payer and one payee, and further comprising non-transitory software for causing the one or more computers to host:
  a first account holding a payer's funds accessible via the network;
  a second account for receiving funds transferred from the first account; said second account accessible via the network;
  a first pin number for facilitating the transfer of funds from the first account to the second account;
  a second pin number for facilitating the return of funds from the second account to the first account; and
  a payment instrument configured to be charged and discharged, which is linked and associated only with the second account; said payment instrument being charged and configured to allow transfer of funds when the funds reside in the second account and is discharged and configured to disallow transfer of funds when the funds do not reside in the second account.

26. The system for facilitating secure financial transactions in accordance to claim 25, further comprising access rules governing access to the second account.

27. The system of claim 25 comprising a server having a memory for hosting the first or second account.

28. The system of claim 27 comprising a web browser for interfacing with the server for accessing the first or second account.

29. The system of claim 25, wherein neither the second pin nor the first pin are used at the point of sale.

30. The system of claim 25, wherein the second pin is used for transferring money from the second account to the first account.

31. A computer implemented system for facilitating secure financial or point of sale transactions between at least one payer and one payee, comprising:
  a computer having a processor and being configured to execute instructions embodied as non-transitory software;
  a plurality of non-transitory software portions, wherein one software portion is configured as a financial services application for managing a first account having a first associated pin number and a second account having a second associated pin number;
  a payment instrument configured to be charged and discharged that is configured to allow a charge when the second account is funded and linked and associated only with the second account;
  a card application that governs transactions made with the payment instrument; and
  one of said software portions configured to transfer funds from the first account to the second account using the first pin number, the payment instrument being charged by the step of transferring funds.

32. The system in accordance with claim 31, wherein the financial services application manages access to data relating to the first and second accounts, including account balances, deposits and withdrawals.

33. The system of claim 31 comprising a server having a memory for hosting the first or second account.

34. The system of claim 33 comprising a web browser for interfacing with the server for accessing the first or second account.

35. The system of claim 31, wherein neither the second pin nor the first pin are used at the point of sale.

36. The system of claim 31, wherein the second pin is used for transferring money from the second account to the first account.

37. A non-transitory software program product for facilitating secure on-line or point of sale transactions, the non-transitory software program product executing the steps of:
- a computer having a processor and being configured to execute instructions embodied as the software program product;
- a plurality of software portions, wherein one software portion is configured for receiving a request for establishing a first account, the first account having an associated first pin number;
- one of said software portions is configured for receiving a request for establishing a second account, the second account having an associated second pin number;
- one of said software portions is configured for receiving a request for the transfer of funds from the first account to the second account using the first pin number, the second account charging a payment instrument configured to be charged and discharged; said payment instrument linked and associated only with the second account; and
- one of said software portions is configured for receiving a request to discharge the second account at a predetermined time interval.

38. The non-transitory software program product of claim 37 comprising the step of processing the request for establishing a first account, by utilizing a server having a memory.

39. The non-transitory software program product of claim 38 comprising the step of accessing the first or second account information hosted by the server by using a web browser.

40. The non-transitory software program product of claim 37, wherein neither the second pin nor the first pin are used at the point of sale.

41. The non-transitory software program product of claim 37, comprising the step of using the second pin to transfer money from the second account to the first account.

* * * * *